United States Patent [19]

Sjöbom

[11] Patent Number: 4,625,859
[45] Date of Patent: Dec. 2, 1986

[54] SCREW FEEDER

[75] Inventor: Axel H. Sjöbom, Bellevue, Wash.

[73] Assignee: Sunds Defibrator Aktiebolag, Sundsvall, Sweden

[21] Appl. No.: 675,317

[22] Filed: Nov. 27, 1984

[30] Foreign Application Priority Data

Dec. 20, 1983 [SE] Sweden ................................ 8307046

[51] Int. Cl.⁴ .............................................. B65G 33/30
[52] U.S. Cl. ...................... 198/665; 198/666
[58] Field of Search ................ 198/664, 665, 666, 675

[56] References Cited

U.S. PATENT DOCUMENTS

| 233,320 | 10/1880 | Brewer | 198/664 |
| 241,278 | 5/1881 | Barnard | 198/665 |
| 296,477 | 4/1884 | Smith | 198/665 |
| 349,233 | 9/1886 | Nelson | 198/664 |
| 1,211,398 | 1/1917 | Burgard | 198/665 |
| 1,404,697 | 1/1922 | Lieber | 198/665 |
| 3,885,665 | 5/1975 | Fisher | 198/675 |

Primary Examiner—Joseph E. Valenza
Assistant Examiner—Daniel R. Alexander
Attorney, Agent, or Firm—Burns, Doane, Swecker & Mathis

[57] ABSTRACT

A screw feeder with a reversibly rotating axle (14) for feeding material in a definite direction. The axle (14) is provided with feed elements (21,25) having two feeding flanks, each formed as a portion of a right-hand and, respectively, left-hand thread screw. The feed elements (21,25) preferably are attached on annular members (20,24), which are arranged one after the other along the axle (14). Each feed element (21,25) is rotatable about the axle (14) through a definite angle in relation to adjacent feed elements, so that the feed direction is maintained irrespective of the rotation direction of the axle (14). At least one of the feed elements being operably coupled to the axle for rotation therewith.

8 Claims, 7 Drawing Figures

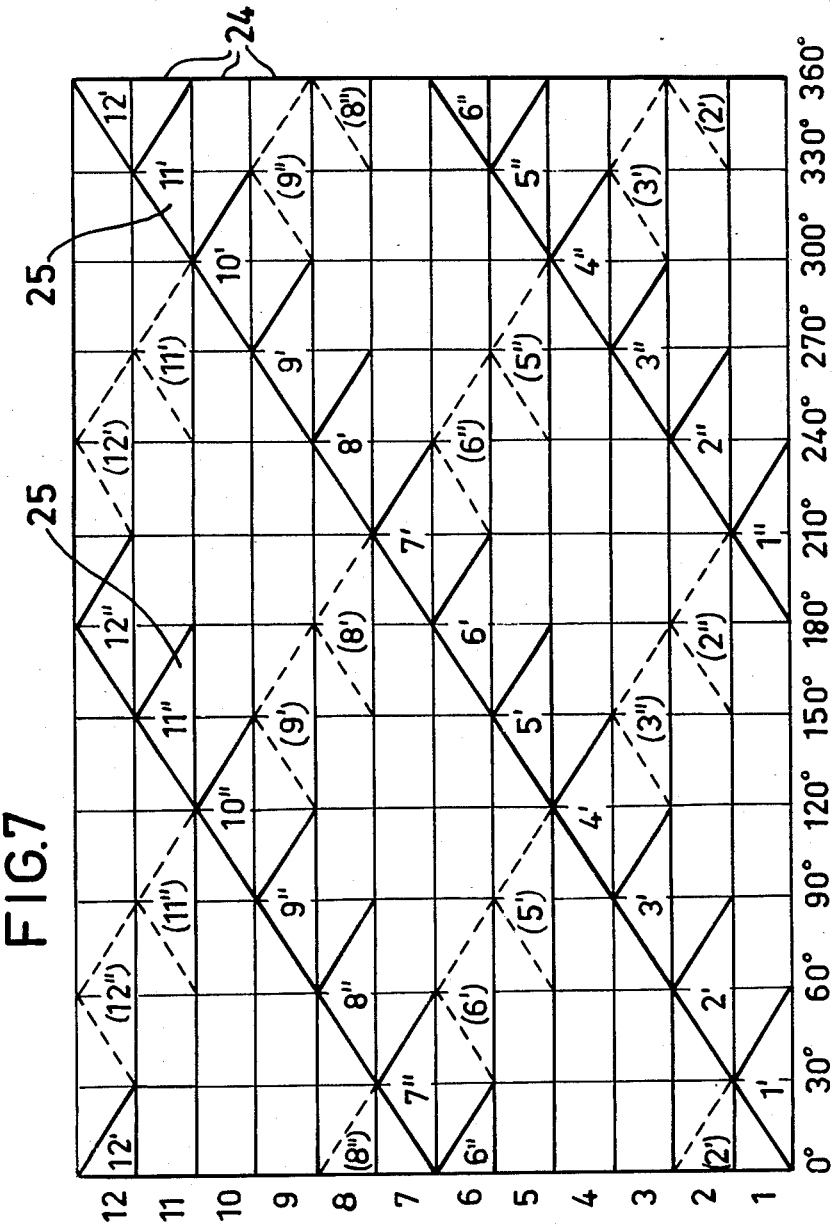

4,625,859

SCREW FEEDER

BACKGROUND AND OBJECTS OF THE INVENTION

This invention relates to a screw feeder for conveying material in a definite direction irrespective of the rotation direction of the screw feeder. The screw feeder according to the invention is intended primarily for feeding cellulose-containing material to a grinder (disc refiner), but it can also be used for feeding other material to apparatuses of other types. It is imaginable, for example, to use the screw feeder for feeding coal to a boiler. The invention generally is applicable when a reversible feed screw is desired and at the same time the feed direction is to be maintained.

Reversible screw feeders with adjustable thread elements are per se known. The thread elements are designed as wings extending 180° about the screw axle. Each wing is rotatable on an axle extending radially in relation to the screw axle. A plurality of such wings are arranged one after the other on the screw axle, and by rotating the wings about their radial axles it is possible to adjust the wings so that they together form either a right-hand thread or a left-hand thread. Such an arrangement is disclosed, for example, in U.S. Pat. No. 1,320,214.

A screw feeder of this kind, however, has a restricted application range, because the construction is weak and the adjusting is complicated. It cannot be used, either, at a high number of revolutions of the screw axle.

In order to further elucidate the invention, the background of the invention is discussed in the following with reference to the grinding of lignocellulose-containing material in a grinder of disc-refiner type for the production of fibre pulp.

This technique implies a mechanical treatment of the material between opposed refiner discs, which both rotate in opposed directions, or one of which is stationary and the other one rotates. These refiner discs are provided with refining surfaces comprising bars and grooves for processing the material, which is supplied through one refiner disc and moves outward between the refiner discs by action of the centrifugal force.

The refining surfaces usually are formed on detachable refiner elements, which are mounted on the refiner discs. During the processing of the material, the bars on the refiner elements, especially the leading edges of the bars seen in the rotation direction of the refiner discs, are gradually worn.

For compensating this wear, it is desirable to turn the rotation direction of the refiner discs in intervals of operation hours. Hereby the previous leading edge of the bars is replaced by the less worn trailing edge. This method can be carried out in cases where the material is advanced to the refiner discs by a separately driven feed device of screw type which, for example, can be mounted concentrically about an axle carrying a refiner disc.

In certain cases, however, it is very difficult or impossible to use a concentrically mounted feed device, because such a device is relatively complicated and requires much space. This applies especially to refiners with opposed or through rotation axles. The feed-in there is effected through a screw thread, which is fixed stationary on the axle of the refiner disc. This screw thread, thus, rotates with the refiner disc and thereby renders it impossible to revers the rotation direction of the refiner disc. As pointed out above, this results in that only one side of the bars on the refining surfaces are worn. Hereby the service life of the refiner elements is shortened, which implies increasing costs for the pulp manufacture.

Another way of solving this problem is to mount stationary radial members with triangular cross-section on the rotary axle of the refiner disc. Upon rotation of the axle in either direction, the flanks of these members subject the material supplied to momentary impacts and thereby cause the material to move to the feed-in opening of the refiner disc. Such a jerky feed yields a very low feed-in effect compared to a continuous advancing flank of screw thread type.

The present invention has the object to produce a screw feeder with a reversible feed screw having a continuous feed flank of screw shape. The material is to be advanced in a definite direction irrespective of the rotation direction of the feed screw.

SUMMARY OF THE INVENTION

The screw feeder according to the invention comprises feed elements rotatable about the axle, which elements in response to the rotation direction of the axle are adjusted to be a right-hand or a left-hand thread. At the advancing of material with high concentration or of material, which for some other reason implies high feed resistance, this resistance can be sufficient for bringing about the desired adjustment of the feed elements when the axle is reversed. At material with lower concentration the acceleration forces at the reversing of the axle can be utilized for adjusting the thread flank. The adjusting also can be carried out manually or automatically by means of mechanical or electro-mechanical devices of conventional type.

BRIEF DESCRIPTION OF THE DRAWINGS

The invention is described in greater detail in the following, with reference to the accompanying drawings showing an embodiment of the invention used in connection with the refining of lignocellulose-containing material, in which drawings FIG. 7 is a schematic spread view of a screw thread with two flanks.

DETAILED DESCRIPTION OF PREFERRED EMBODIMENTS OF THE INVENTION

Figure 1:
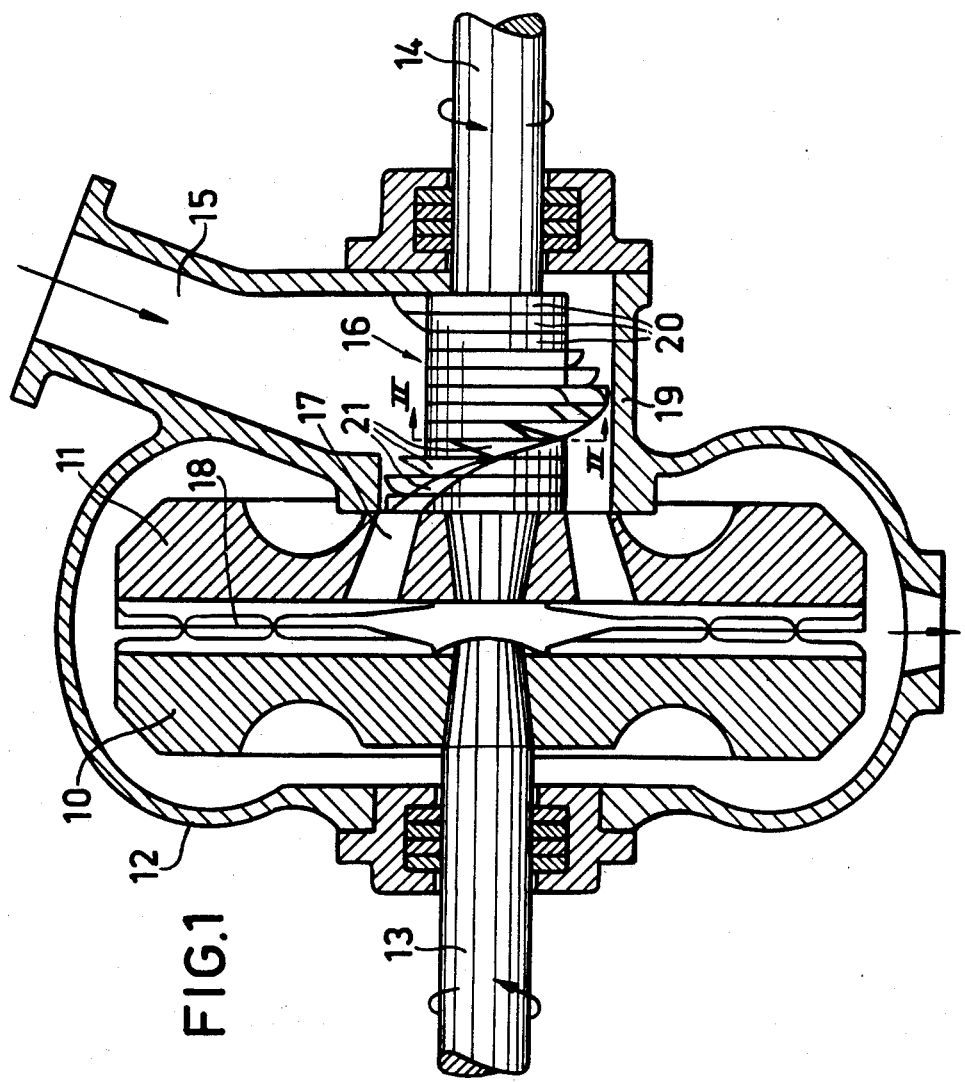
FIG. 1 is a cross-section through a refiner where the screw feeder is used for feeding-in material.
Figure 2:
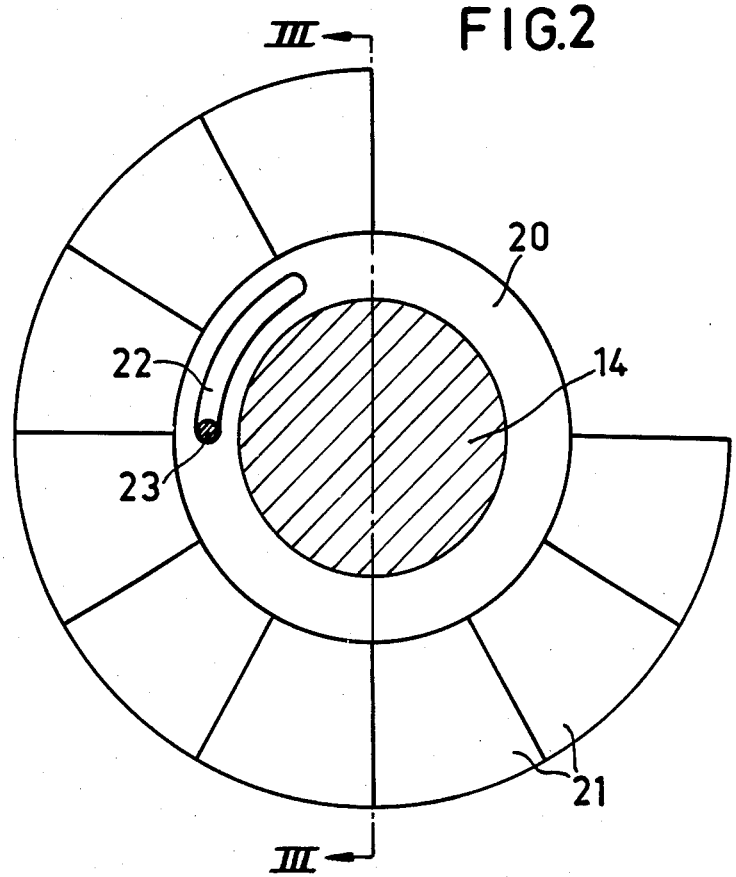
FIG. 2 is a section according to II—II in FIG. 1 on an enlarged scale.
Figure 4:
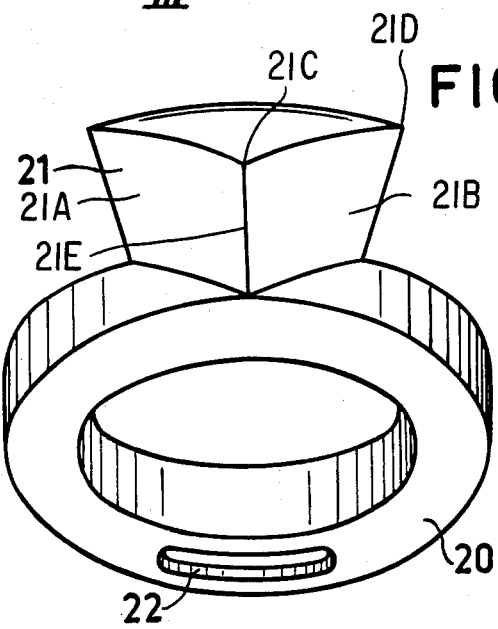
FIG. 4 shows a rotary member with a feed element.
Figure 3:
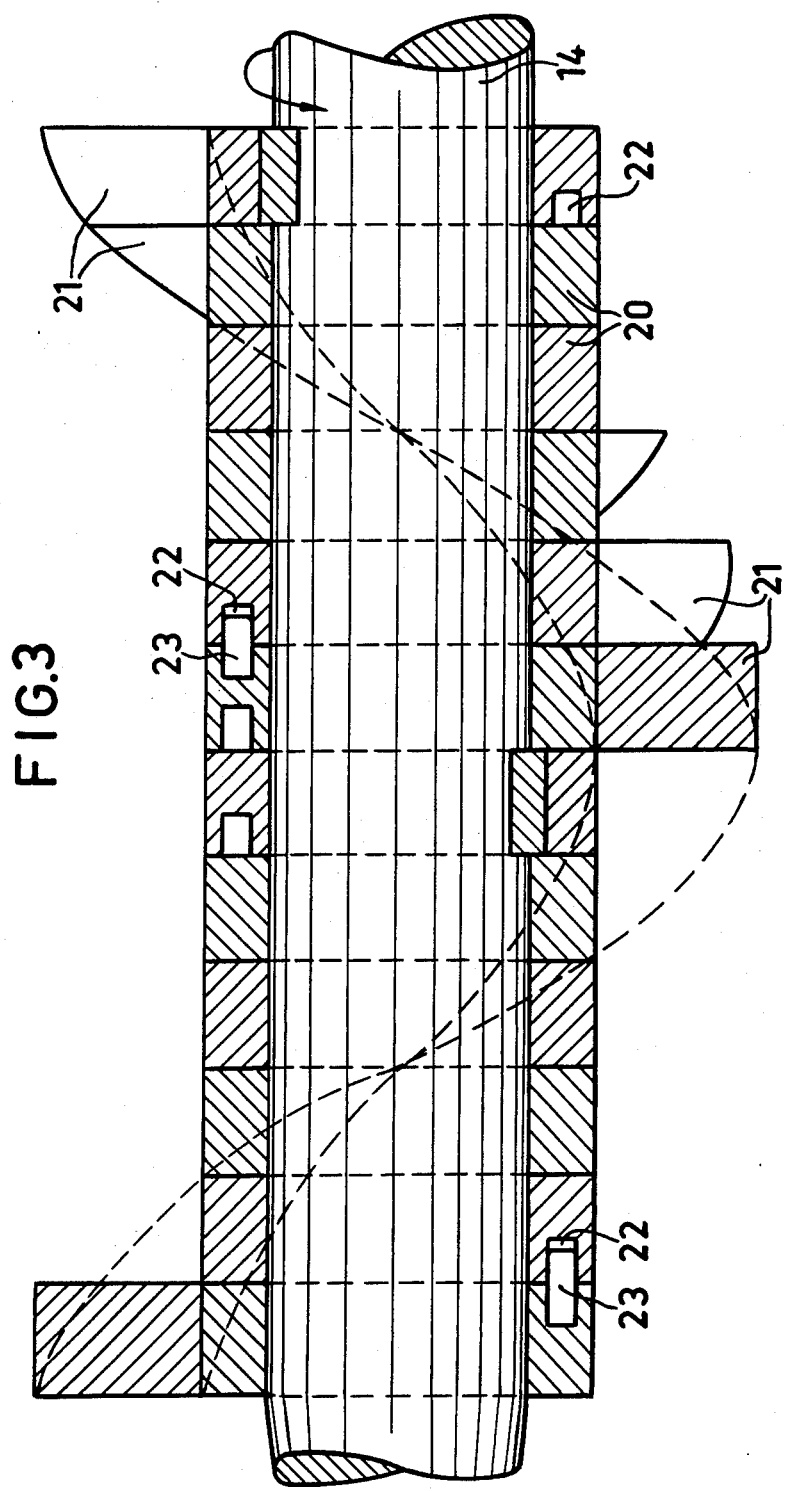
FIG. 3 is a section according to III—III in FIG. 2.

The refiner shown in FIG. 1 comprises two counter-rotating refining members 10,11, which are enclosed in a refiner housing 12. The refining members are supported each on a rotary axle 13,14, which are mounted in a stand (not shown). One refining member 10 is axially movable for adjusting the gap between the refining members. The material to be processed (refined) is introduced through the inlet 15 to a screw feeder 16 with adjustable feed members. The material is advanced by the screw feeder through openings 17 in the refining member 11 in to the space between the refining members, from where it is moved by action of the centrifugal force outward through the gap 18 and at the same time is processed by the opposed surfaces of the refining members 10,11. Except for the screw feeder 16, the refiner is of conventional design, and a description thereof in detail, therefore, is not necessary.

Figure 6:
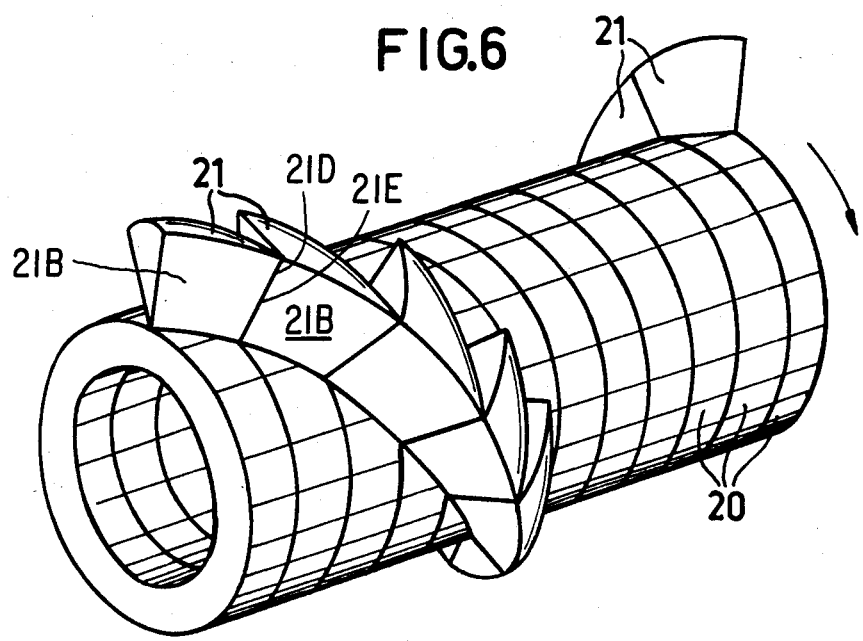
FIG. 6 is a persective view of a series of feed elements, which together form a screw thread.

The screw feeder 16 comprises a cylindric housing 19, in which the axle 14 rotates. On said axle 14 a series of rotary annular members 20 are located one after the other about the axle 14. Each member 20 is provided with a feed element 21 extending radially outward and formed with two feeding flanks 21A, 21B. One flank is formed as a portion of a right-hand threaded screw, and the other flank is formed as a portion of a left-hand threaded screw. Each of the flanks 21A, 21B has longitudinally spaced leading and trailing ends 21C, 21D and is curved from the leading end to the traling end. The first and second ends are joined at their leading ends to form a radially extending apex 21E. The feed elements 21 are rotatable about the axle and adjustable in relation to each other, so that they together form a continuous right-hand or left-hand threaded feed flank about the axle, wherein the apexes 21E are aligned with trailing ends 21D of the preceding flanks (see FIG. 6). The angle of the flanks, the pitch of the screw, must be determined in view of the desired number of revolutions and capacity of the screw.

The embodiments shown of the screw feeder comprise twelve feed elements 21 located each on an annular member 20. The number of elements 21 and members 20, however, can be varied according to the desired thread pitch and screw length.

Each member 20 is provided with means for limiting the rotation about the axle relative to adjacent members, so that a continuous right-hand or left-hand threaded flank can be adjusted. According to FIG. 5 the screw is rotated so that a right-hand threaded flank is adjusted. Upon rotation of the axle in the opposite direction, the members 20 are adjusted so that the continuous flank is left-hand threaded. The feed direction is all the time the same, irrespective of the rotation direction of the axle.

According to the embodiment shown in FIGS. 1-4, the means limiting the rotation of the annular members 20 comprise a groove 22 in one axially directed surface of the member 20. This axial groove 22 co-operates with a protrusion 23 on the other axially directed surface of the adjacent member 20. The groove 22 extends in the circumferential direction, and its length depends on the design of the feed elements. Each feed element 21, thus, shall be rotatable in relation to adjacent feed elements, so that a right-hand or left-hand threaded continuous flank is formed.

Figure 5:
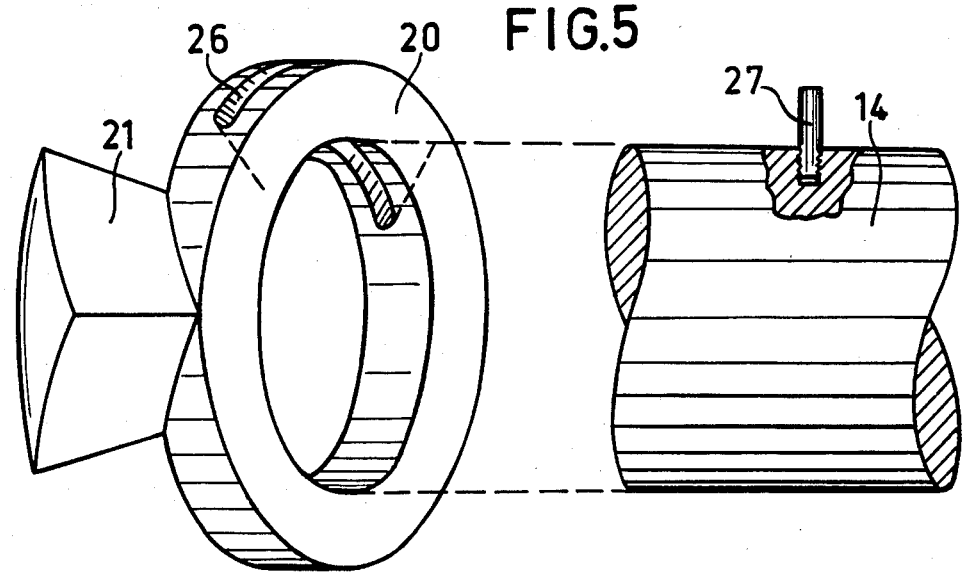
FIG. 5 shows an alternative design of a rotary member and a portion of the axle.

According to another embodiment, which is shown in FIG. 5, the means limiting the rotation of the annular members 20 comprise a radially directed groove 26. This radial groove 26 co-operates with a protrusion 27 in the form of a locking pin on the axle 14. The locking pin preferably is screwn into a hole on the axle. The groove 26 extends in the circumferential direction and its length depends on the design of the feed elements 21 and on the position in the series of annular members 20. Due to the fact that the radial grooves 26 are open outwards, they are self-cleaning owing to the action of the centrifugal force.

The screw feeder according to the embodiment shown comprises twelve annular members 20 with twelve feed elements 21, which together form a continuous thread flank extending through 360° about the axle. This implies, that each feed element embraces an angle of 30° about the axle. For being adjustable from right-hand to left-hand thread, thus, each feed element 21 must be rotatable through 60° in relation to adjacent feed elements, i.e. the groove 22 in each annular member 20 shall extend through 60° in the circumferential direction of the axle. When the screw thread instead should comprise only six feed elements, the grooves had to extend through 120° in the circumferential direction of the axle.

For being capable to act as conveying means, at least one of the annular members 20 and associated feed elements 21 must be so coupled to the axle 14 as to follow along with the rotation of the axle. The remaining members 20 then adjust themselves in relation to the member coupled to the axle by rotating through a certain angle as described above. Also the members located a multiple of 180° from the member coupled according to above to the axle can be coupled to the axle so that only intermediate members are rotated from one thread direction to the other. They would otherwise be rotated about the entire axle in order to again resume the same position relative to the firstmentioned coupled member.

It is also possible to arrange two or more thread flanges by providing each member with two or more feed elements. The adjustment takes place according to the same principle as described above for one thread flank. In FIG. 7 a spread view of a screw with two thread inlets, i.e. with two adjustable thread flanks, is shown schematically. The screw comprises twelve annular members 24 each with two feed elements 25. In the Figure, the feed direction is upward, irrespective of the rotation direction, left or right, of the screw. The twelve annular members are numbered from 1 to 12, and the feed elements are numbered from 1' to 12', and, respectively, from 1" to 12". At this embodiment, the members Nos. 1,4,7 and 10 are not rotatable in relation to the axle, but the remaining members are rotatable in relation to the axle. All members, however, are rotatable through 60° relative to adjacent members. At the rotation direction to the left in the Figure, the members and therewith the feed elements are in the positions indicated by fully drawn lines. At the rotation direction to the right the members and feed elements are adjusted to the positions shown by dashed lines in the Figure.

It is essential for the functioning that the first member is coupled to the axle, i.e. the member which is located in the inlet end of the screw. As regards the number of members coupled to the axle, it is found that this depends on the number of thread flanks and the number of turns, through which each thread flank extends about the axle. The number of members coupled to the axle, thus, shall be 2N per thread flank turn where N is the number of thread flanks.

At a thread pitch of 30°, i.e. twelve annular members per thread turn, four thread flanks are the maximum number to be used. This implies that relative to the axle every second member is rotatable and every second member is coupled. It seems unpractical, however, to use more than three thread flanks, because the feed elements proper require space in the screw feeder and thereby reduce the capacity.

The invention, of course, is not restricted to the embodiments shown, but can be varied within the scope of the invention idea.

I claim:

1. A screw feeder for conveying material in a longitudinal direction, comprising an axle which is reversibly rotatably driven about a longitudinal axis, and a plurality of feed elements mounted longitudinally successively on said axle; each said feed element comprising first and second feeding flanks facing in said longitudinal direction and converging in said longitudinal direction, each of said first and second flanks having longitudinally spaced leading and trailing ends and being curved from said leading end to said trailing end, said first and second flanks being joined at their leading ends to form a radially extending apex, said feed elements being rotatably adjustable relative to one another about said axis by a selected distance in a first direction to bring said apexes into general alignment with said trailing ends of said first flanks to form a right-hand screw flank, and by a selected distance in a second direction to bring said apexes into general alignment with said trailing ends of said second flanks to form a left-hand screw flank; at least one of said feed elements being operably coupled to said axle for rotation therewith.

2. A screw feeder according to claim 1 wherein said feed elements are freely rotatably mounted on said axle for movement by said selected distance so as to be self-adjusting in response to rotation of said axle.

3. A screw feeder according to claim 2 wherein said feed elements include slots extending circumferentially for said selected distance, said axle carrying protrusions received in said slots.

4. A screw feeder according to claim 3 wherein said slots are radially open and said protrusions project radially thereinto.

5. A screw feeder according to claim 2 wherein said feed elements include slots extending circumferentially for said selected distance, said feed elements including projections receivable in said slot of an adjacent feed element.

6. A screw feeder according to claim 5, wherein said slots are longitudinally open and said protrusions project longitudinally thereinto.

7. A screw feeder according to claim 1, wherein said feed elements are manually rotatable by said selected distance.

8. A screw feeder according to claim 1, including a plurality of longitudinally successive annular members upon which said feed elements are mounted, each annular member carrying a plurality of said feed elements to form a plurality of screw flanks.

* * * * *